US012444593B2

(12) United States Patent
Hoang et al.

(10) Patent No.: US 12,444,593 B2
(45) Date of Patent: Oct. 14, 2025

(54) APPARATUS AND METHOD FOR HIGH-PERFORMANCE CHARGED PARTICLE DETECTION

(71) Applicant: LUXEMBOURG INSTITUTE OF SCIENCE AND TECHNOLOGY (LIST), Esch-sur-Alzette (LU)

(72) Inventors: Hung Quang Hoang, Esch-sur-Alzette (LU); Tom Wirtz, Esch-sur-Alzette (LU); Rathaiah Pureti, Esch-sur-Alzette (LU); Olivier Bouton, Esch-sur-Alzette (LU)

(73) Assignee: LUXEMBOURG INSTITUTE OF SCIENCE AND TECHNOLOGY (LIST), Esch-sur-Alzette (LU)

( * ) Notice: Subject to any disclaimer, the term of this patent is extended or adjusted under 35 U.S.C. 154(b) by 530 days.

(21) Appl. No.: 17/925,644

(22) PCT Filed: May 17, 2021

(86) PCT No.: PCT/EP2021/063007

§ 371 (c)(1),
(2) Date: Nov. 16, 2022

(87) PCT Pub. No.: WO2021/233833

PCT Pub. Date: Nov. 25, 2021

(65) Prior Publication Data

US 2023/0170205 A1 Jun. 1, 2023

(30) Foreign Application Priority Data

May 18, 2020 (LU) .................................. LU101794

(51) Int. Cl.
*H01J 49/02* (2006.01)

(52) U.S. Cl.
CPC .................................. *H01J 49/025* (2013.01)

(58) Field of Classification Search
USPC .......................................................... 250/397
See application file for complete search history.

(56) References Cited

U.S. PATENT DOCUMENTS 3,955,084 A 5/1976 Giffin
6,521,887 B1 2/2003 Funsten et al.
2006/0231751 A1 10/2006 Zuleta et al.
2011/0278448 A1* 11/2011 Syrstad ................. H01J 49/486 250/397
2013/0187041 A1* 7/2013 Brouard .................. H01J 49/40 250/282

FOREIGN PATENT DOCUMENTS

WO 2012/010894 A1 1/2012

OTHER PUBLICATIONS

International Search Report, International Application No. PCT/EP2021/063007 dated Jul. 29, 2021, 2 pages.

* cited by examiner

*Primary Examiner* — Kiet T Nguyen
(74) *Attorney, Agent, or Firm* — RANKIN, HILL & CLARK LLP

(57) ABSTRACT

A detection apparatus and method for detecting charged particles. The device relies on a detection assembly comprising microchannel plates. The useful surface of the microchannel plate device is maximized in time through the use of beam deflection means upstream of the detection front.

20 Claims, 2 Drawing Sheets

APPARATUS AND METHOD FOR HIGH-PERFORMANCE CHARGED PARTICLE DETECTION

TECHNICAL FIELD

The invention lies in the field of charged particle detectors. In particular, it relates to a high-performance apparatus for detecting charged particles, which finds application among others in Mass Spectrometry, including Secondary Ion Mass Spectrometry, SIMS.

BACKGROUND OF THE INVENTION

Mass spectrometry is an analytical technique that is commonly used to determine the elements that compose a molecule or sample. A mass spectrometer typically comprises a source of ions, a mass separator and a detector. The source of ions may for example be a device that is capable of converting the gaseous, liquid or solid phase of sample molecules into ions, that is, electrically non-neutral charged atoms or molecules. Several ionization techniques are well known in the art, and the particular structure of an ion source device will not be described in any detail in the present specification. Alternatively, the ions to be analyzed by the mass spectrometer may result from the interaction between the sample in its gaseous, liquid or solid phase and an irradiation source, such as a laser, ion or electron beam. The ion-emitting sample is in that case considered to be the source of ions.

The ion beam that originates at the ion source is analyzed using a mass analyzer, which is capable of separating, or sorting, the ions according to their mass-to-charge ratio. The ratio is typically expressed as m/z, wherein m is the mass of the analyte in unified atomic mass units, and z is the number of elementary charges carried by the ion. The Lorentz force law and Newton's second law of motion in the non-relativistic case characterize the motion of charged particles in space. Mass spectrometers therefore employ electrical fields and/or magnetic fields in various known combinations in order to separate the ions emanating from the ion source. An ion having a specific mass-to-charge ratio follows a specific trajectory in the mass-analyzer. As ions of different mass-to-charge ratios follow different trajectories, the composition of the analyte may be determined based on the observed trajectories. By analogy with an optical spectrometer, which allows generation of a spectrum of the different wavelengths comprised in a wave beam, the mass spectrometer allows for generating a spectrum of the different mass-to-charge ratios comprised in a molecule or sample.

Sector instruments are a specific type of mass analyzing instrument. A sector instrument uses a magnetic field or a combination of an electric and magnetic field to affect the path and/or velocity of the charged particles. In general, the trajectories of ions are bent by their passage through the sector instrument, whereby light and slow ions are deflected more than heavier fast ions. Magnetic sector instruments generally belong to two classes. In scanning sector instruments, the magnetic field is changed, so that only a single type of ion is detectable in a specifically tuned magnetic field. By scanning a range of field strengths, a range of mass-to-charge ratios can be detected sequentially. In non-scanning magnetic sector instruments, a static magnetic field is employed. A range of ions may be detected in parallel and simultaneously. The known non-scanning magnetic sector instruments are typically classified as Mattauch-Herzog type mass spectrometers.

A Mattauch-Herzog type mass analyzer consists of an electrostatic sector, ESA, followed on the secondary ion trajectories by a magnetic sector. The arrangement of the electrostatic sector and the magnetic sector typically allows to disperse a wide range of mass-to-charge ratios m/z along the exit plane of the magnetic sector. All the ion masses are focused on a focal plane located at the exit plane (in the original Mattauch-Herzog configuration), or at a distance from the exit plane of the magnetic sector. Most of the known Mattauch-Herzog type mass spectrometers are able to operate in the double focusing condition (achromatic mass filtering) for the highest mass resolving power. A typical mass resolving power from hundreds to thousands are achieved.

One interesting features of this mass spectrometer architecture is its capability to capture simultaneously a wide range of the mass spectrum, provided that it is equipped with an appropriate detection system, ideally comprising a focal plane detector. A focal plane detector is able to simultaneously acquire the full mass spectrum in a short acquisition time, typically in a fraction of a second. This simultaneous acquisition capability offers several benefits. Firstly, a measurement duty cycle of 100% can be achieved. This benefit can result in better detection limits as well as smaller sample sizes needed for the measurement since all the mass-to-charge ratio (m/z) peaks are collected at the same time. Secondly, the ability to simultaneously record the entire mass spectrum allows for using both continuous and pulsed ionization techniques. In particular, the pulsed ionization techniques such as laser ablation/ionization commonly introduce rapid changes in the spectrum signal and therefore sequential detection techniques would cause errors in the measurements.

An ideal focal plane detector for mass spectrometry should be sensitive enough to detect a single ion while the count rate of its single 1-dimensional (1D) pixel (local count rate) should be more than $10^7$ counts per seconds, cps, in order to handle the highest ion beam currents. In practice, a 1D local count rate of more than $10^6$ cps/mm is typically required. Furthermore, the local dynamic range (defined by the signal range in which the detector responds linearly to the detected signal) is also required to be $10^5$-$10^6$ in order to accurately measure a wide range of chemical concentrations.

Known detection systems typically comprise at least one microchannel plate, MCP, unit. A typical microchannel plate, MCP, is composed of $10^4$ to $10^7$ miniature electron multipliers whose typical diameters are in the range from 10 to 100 μm. Each channel acts as an individual electron multiplier, which can detect a single ion, electron, atom, molecule or photon. The MCP is typically fabricated from a high resistive material such as lead glass. The front side and rear side of the MCP are metallized electrodes to which a typical voltage difference of about 1000V is applied through appropriate biasing means, such as a source of electricity. When a single energetic particle hits a channel surface, it creates one or more secondary electrons, which are accelerated into an MCP channel by the applied voltage. Each of these secondary electrons can release two or more secondary electrons when hitting the channel wall again. This process is cascaded along the channel Therefore, a single energetic particle hitting a channel creates a cascade of electron emission along the channel, resulting in an electron cloud of at least $10^4$ electrons at the output of the channel. An anode placed behind the MCP can electronically detect the electron cloud to register each single event hitting the MCP. An MCP assembly may comprise a single microchannel plate, or a stacked assembly thereof.

Known MCP-based focal plane detectors, are however plagued by several limitations. A limited local count rate results in the detection signal being saturated for high concentration species. Typical MCPs limit the local count rate to $10^4$-$10^5$ cps/mm$^2$. In known MCP-based focal plane detectors, this local count rate of the MCP limits the 1D local count rate to less than $10^4$-$10^5$ cps/mm. A limited local dynamic range results in poor detectable concentration range of the species. Mass spectrometry typically requires a wide range of dynamic range up to greater than $10^6$. Although the overall dynamic range of known MCP devices is typically greater than $10^7$, the local dynamic range that it allows is hundreds to thousands of times smaller ($10^3$-$10^4$).

The above two limitations of the MCP-based technologies are mainly due to the fact that each MCP channel is limited by a maximum count rate that it can handle, and therefore the maximum local count rate and local dynamic range of one detector pixel are dependent on the number of MCP channels involved in the pixel. Each MCP channel is typically characterized by a dead time of several milliseconds between two detection events and therefore the maximum count rate that a MCP channel can handle is limited to less than $10^2$ cps. Depending on the size of MCP channel, the density of the MCP is typically from $10^3$ to less than $10^4$ channels/mm$^2$. Considering the statistics for avoiding multiple ions hitting the same channel, the maximum count rate of a single MCP is limited to maximum $10^5$ cps/mm$^2$ or less. This limited count rate is typically worse in the MCP stack configurations, where two or three MCPs are joined together in order to improve the overall gain. In this case, a single particle hitting a channel of the first MCP can result in a dead time for several channels of the following MCP plates involved in the detection of this single particle. Therefore, the achievable maximum count rate in such known architecture is much less than $10^4$-$10^5$ cps/mm$^2$, and the local dynamic range is much less than $10^4$ (considering a minimum signal to noise ratio that is larger than 3).

Patent document U.S. Pat. No. 6,521,887 B1 discloses a Time-of-Flight, TOF, spectrometer. It aims at avoiding a pulsed or gated ion beam in order to increase the TOF instrument's duty cycle. Deflection means in the drift region of the instrument are used to deviate the single ion beam to different positions on a detection device, that may comprise an MCP assembly.

Technical Problem to be Solved

It is an objective of the invention to present a device, which overcomes at least some of the disadvantages of the prior art. In particular, the invention aims at providing a charged particle detection apparatus, which yields improved performance over known MCP-based charged particle detectors.

SUMMARY OF THE INVENTION

In accordance with a first aspect of the invention, a detection apparatus for detecting charged particles is provided. The apparatus comprises a charged particle beam inlet. The apparatus further comprises a detection front or area comprising the entry face of at least one microchannel plate, MCP, assembly, wherein the entry face extends along a first direction (Z), wherein the MCP assembly is configured for receiving a beam of charged particles that impinge on its entry face and for generating, for each impinging charged particle, a corresponding amplified detection signal on its opposite exit face. The apparatus comprises at least one read-out anode for collecting said amplified detection signals, the anode being arranged at a distance to, and in parallel with the exit face of said at least one MCP assembly. Still further, the apparatus comprises beam deflection means arranged downstream of said inlet at a distance from said entry face and configured for selectively deflecting an incoming beam of charged particles along said first direction (Z), so that the corresponding charged particles selectively reach different portions of the MCP assembly's entry face along said first direction (Z).

In accordance with a another aspect of the invention, a detection apparatus for detecting charged particles is proposed. The apparatus comprises a charged particle beam inlet, a detection front comprising the entry face of at least one microchannel plate, MCP, assembly. The entry face extends along a first direction (Z). The MCP assembly is configured for receiving, along a second direction (X) perpendicular to said first direction, a plurality of beams of charged particles (10) that impinge on its entry face and for generating, for each impinging charged particle, a corresponding amplified detection signal on its opposite exit face. The apparatus further comprises at least one read-out anode for collecting said amplified detection signals, the anode being arranged at a distance to, and in parallel with the exit face of said at least one MCP assembly. The apparatus further comprises beam deflection means arranged downstream of said inlet at a distance from said entry face and configured for selectively deflecting an incoming beams of charged particles along said first direction (Z), so that the corresponding charged particles selectively reach different portions of the MCP assembly's entry face along said first direction (Z). The charged particle inlet, the beam deflection means, the detection front and the read-out anode extend along said second direction (X).

Preferably, the beam deflection means may comprise a charged particle optics unit and a control unit, the control unit being configured to dynamically control a deflection angle to be applied to the charged particle beam's propagation direction by the charged particle optics unit. The control unit may preferably comprise a data processing unit and a memory element, the data processing unit being programmed by a software code so as to implement the desired functions.

Preferably, the beam deflection means may comprise a charged particle optics unit and a control unit, the control unit being configured to dynamically control an opening angle within which the charged particle beam's propagation direction is deflected by the charged particle optics unit. The control unit may preferably comprise a data processing unit and a memory element, the data processing unit being programmed by a software code so as to implement the desired functions.

Preferably, the charged particle optics unit may comprise a pair of deflection plates or a Bradbury Nielsen Grid. The pair of deflection plates may preferably define a charged particle beam passage in between themselves.

The entry face of said at least one MCP assembly may preferably extend over 2 to 3 cm along said first direction (Z)

Preferably, the detection front or area may further extend along a second direction (X) perpendicular to said first direction (Z), and wherein entry faces of a plurality of MCP assemblies extend over an aggregated length of at least 15 cm in said second direction (X). The first direction may preferably be perpendicular to the plane in which the incoming charged particle beam's trajectory evolves prior to being deflected by said beam deflection means.

The entry faces of the plurality MCP assemblies may preferably extend over an aggregated length between 1 and 100 cm.

It may be preferred that a gap of at most 1 mm width separates the respective exit faces of any two adjacent MCP assemblies along said second direction (X).

The gap size between any two adjacent MCP assemblies may preferably be the same.

Preferably, the gap separating any two adjacent read-out anodes may have substantially the same width as the gap separating the entry and exit faces of the corresponding two adjacent MCP assemblies.

All MCP assemblies may preferably have substantially the same channel size and amplification gain characteristics.

Preferably, all MCP assemblies may have the same width extending perpendicularly to said principal direction.

The detector's front area may preferably consist of the entry faces of said MCP assemblies.

Preferably, the device may comprise biasing means configured for applying an electric potential difference between the respective entry and exit faces of each MCP assembly. The biasing means may preferably comprise a source of electricity.

The biasing means may preferably be configured for applying a positive or negative floating electric potential to the detector's front face. The biasing means may preferably comprise a source of electricity.

Preferably, the biasing means may be configured for applying a common electric potential to the respective exit faces of all MCP assemblies.

Preferably, the biasing means may be configured for applying a positive or negative floating electric potential to the beam deflection means. The potential may preferably be the same as the floating potential applied to the detector's front face.

Preferably the biasing means may be configured for applying a positive or negative floating electric potential to components of the apparatus. The components may preferably include the beam deflection means and the detector front, being part of the MCP assemblies.

The MCP assemblies may preferably comprise a stacked assembly of a plurality of multiple MCP devices, a chevron assembly or a Z-stacked assembly.

The apparatus may further preferably comprise one dedicated read-out anode for each MCP assembly, and said read-out anode may preferably extend along a corresponding MCP assembly's exit face.

The at least one read-out anode may preferably comprise a delay-line anode, a pixelated anode array, a resistive anode, a shaped anode, a single anode or any combination thereof.

Preferably, the beam deflection means may extend along said second direction (X).

Preferably, said charged particles may comprise ions. Preferably, the charged particles may comprise electrons.

In accordance with another aspect of the invention, a mass spectrometer for dispersing ions along a focal plane in accordance with their mass/charge ratio is provided. The spectrometer comprises a detection apparatus having a detection front, the detection front being arranged on said focal plane so that said dispersed ions impinge on the detection front. The spectrometer is remarkable in that said detection apparatus conforms to an aspect of the invention, and in that said first direction (Z), along which the detection front extends, is perpendicular to the plane in which the ions are dispersed by the mass spectrometer.

Preferably, deflection means of said detection apparatus comprised in said mass spectrometer may be are arranged so as to deflect all dispersed ions exiting a mass filtering unit of the mass spectrometer. The mass filtering unit may preferably comprise a magnetic sector instrument.

Preferably, the detection front of said detection apparatus comprised in said mass spectrometer may span said focal plane so that any ions dispersed by a mass filtering unit of the mass spectrometer impinge there upon.

Preferably, the mass spectrometer may be a Secondary Ion Mass Spectrometry, SIMS, device. The mass spectrometer device may further preferably be a Mattauch-Herzog type device.

The mass spectrometer may preferably be configured for being used in a floating configuration.

In accordance with a further aspect of the invention, a method for detecting charged particles is provided. The method uses the apparatus in accordance with an aspect of the invention. The method comprises the following steps:

i) providing a charged particle beam; the beam may preferably have a propagation direction;
ii) using the device's beam deflection means, deflecting said charged particle beam in accordance with a predetermined deflection angle along said first direction (Z) in which at least one MCP assembly extends;
iii) using the device's at least one read-out anode, reading out the amplified detection signal, as provided by said at least one MCP assembly;
iv) repeating steps ii) and iii) at least once using a different predetermined detection angle.

In accordance with a further aspect of the invention, a method for detecting charged particles is provided. The method uses the apparatus in accordance with an aspect of the invention. The method comprises the following steps:

i') providing a plurality of charged particle beams; the beams may preferably have a propagation direction;
ii') using the device's beam deflection means, deflecting said charged particle beams in accordance with a predetermined deflection angle along said first direction (Z) in which at least one MCP assembly extends;
iii') using the device's at least one read-out anode, reading out the amplified detection signals, as provided by said at least one MCP assembly;
iv') repeating steps ii) and iii) at least once using a different predetermined detection angle.

In accordance with another aspect of the invention, a method of using the mass spectrometer in accordance with an aspect of the invention is provided. The method comprises the following steps:

a) dispersing ion species comprised in a secondary ion beam using a mass filtering unit of said spectrometer device, thereby generating a plurality of ion beams;
b) using the spectrometer's beam deflection means, which are part of the mass spectrometer's detection apparatus, deflecting said plurality of ion beams in accordance with a predetermined deflection angle along said first direction (Z) in which at least one MCP assembly extends;
c) using the spectrometer's at least one read-out anode, which is part of the mass spectrometer's detection apparatus, reading out the amplified detection signal, as provided by said at least one MCP assembly;
d) repeating steps b) and c) at least once using a different predetermined detection angle.

Preferably, steps ii) and iii) or respectively b) and c) may be repeated so as to scan the charged particle beam or respectively the plurality of ion beams over the extent of the entry face of said at least one MCP assembly along said first direction (Z).

Preferably, steps ii) and iii) may be repeated so as to scan the extent of the entry face of said at least one MCP assembly along said first direction (Z).

Preferably, steps b) and c) may be repeated so as to scan the plurality of ion beams over the extent of the entry face of said at least one MCP assembly along said first direction (Z).

Preferably, the beam deflection means may comprise a charged particle optics unit and a control unit, the control unit being configured to dynamically control a deflection angle to be applied to the charged particle beam's propagation direction by the charged particle optics unit. Between two successive iterations of step ii) or respectively step b), the deflection angle may preferably be altered so that the spot generated during a first iteration by a deflected beam on the entry face of said at least one MCP assembly does not overlap with the spot generated during a second iteration by the same deflected beam.

Between two successive iterations of step ii), the deflection angle may preferably be altered so that the spot generated during a first iteration by the deflected beam on the entry face of said at least one MCP assembly does not overlap with the spot generated during a second iteration.

Between two successive iterations of step b), the deflection angle may preferably be altered so that the spot generated during a first iteration by a deflected ion beam on the entry face of said at least one MCP assembly does not overlap with the spot generated during a second iteration by the same deflected ion beam.

The successively read-out amplified detection signals may preferably be stored in a memory element and combined by a data processing unit so as to yield a combined detection signal corresponding to a given charged particle or to a given plurality of dispersed ion species.

The successively read-out amplified detection signals may preferably be stored in a memory element and combined by a data processing unit so as to yield a combined detection signal corresponding to a given charged particle.

Said combination may preferably comprise adding up successively read-out detection counts for a given charged particle.

The successively read-out amplified detection signals may preferably be stored in a memory element and combined by a data processing unit so as to yield a combined detection signal corresponding to a given plurality of dispersed ion species. The combined detection signal may preferably correspond to a mass spectrum data recorded using a given deflection angle.

The proposed invention provides a charged particle detection apparatus, which yields improved performance over known MCP-based charged particle detectors. To overcome the limitations of known MCP-based charged particle detectors, it is proposed to decouple the detectable ion beam signal from the detector's spatial resolution. In accordance with aspects of the invention, the number of the MCP channels of the detector that are involved in detecting a charged particle beam hitting the detector is increased. This is achieved by changing the position of the ion beam spot that hits the detector's front surface, where the MCP channel inlets are located. While a given set of MCP channels is saturated by the incoming beam, the beam is deflected to a set of yet unused MCP channels. The corresponding detection signals stemming from a plurality of sequentially sets of MCP-channels may be combined to reconstruct the total detection signal. While maintaining the detector's spatial resolution, the aspects of the proposed invention improve on the detectable maximum local count rate and dynamic range. An improvement factor of at least 10 has been observed. The proposed detection apparatus is particularly useful in a MCP-based 1D focal plane detector for high dynamic mass spectrometry applications, including Secondary Ion Mass Spectrometry, SIMS. In such a scenario, ion beams exiting the mass spectrometer's mass filtering unit (e.g. a magnetic sector instrument), are scanned in the vertical direction of the detector while not disturbing the spread of the focused ion beams in the horizontal direction.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

Figure 1:
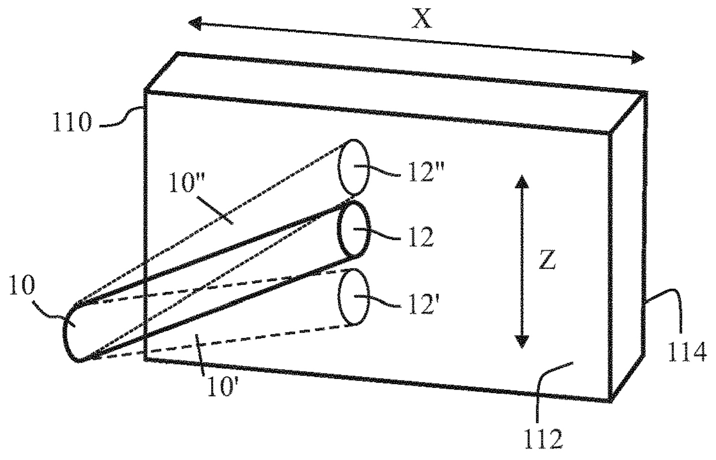
FIG. 1 is a schematic illustration of a perspective view of a charged particle beam hitting a detector assembly.

This section describes features of the invention in further detail based on preferred embodiments and on the figures, without limiting the invention to the described embodiments. Unless otherwise stated, features described in the context of a specific embodiment may be combined with additional features of other described embodiments. Throughout the description, similar reference numerals will be used for similar or the same concept across different embodiments of the invention. For example, references 100, 200, 300, 400 and 500 each describe a detection apparatus in accordance with the invention, but in two respective embodiments thereof.

The description puts focus on those aspects of the proposed detector apparatus that are relevant for understanding the invention. It will be clear to the skilled person that the device also comprises other commonly known aspects, such as for example an appropriately dimensioned power supply, or a mechanical holder frame for holding the various elements of the apparatus in their respectively required positions, even if those aspects are not explicitly mentioned.

FIG. 1 illustrates a charged particle beam 10. By way of a non-limiting example, the beam may correspond to an ion beam exiting the magnetic filtering sector of a mass spectrometer. The ion beam hits a charged particle detector 110 that would typically extend along the focal plane of the mass spectrometer in the direction indicated by the letter X. The detector's front 112 is comprised of entry faces of channels of a microchannel plate, MCP, assembly. The channels are used to amplify the detected ions that enter them into a measurable detection signal that is generated on the corresponding exit face 114. In known MCP-based detectors, the ion beam 10 (solid lines) always hits the detector 110 on the same spot 12 along the Z direction, which is a perpendicular direction to the X direction. The 1D pixel size along the detector in the X-direction does not depend on the active width of the detector in the vertical direction Z. The wider the active width in the Z-direction is, the larger the number of the channels potentially contained in one 1D pixel. A typical ion beam in a magnetic sector mass spectrometry instrument is well focused onto a small spot size of few hundreds μm in the X-direction by a few thousands μm (typically less than 2000 μm) in the Z-direction. The beam therefore typically hits only a part of the available active width of the detector in the Z-direction, resulting in a limited actual number of amplifying channels in each 1D pixel involved in detecting the ion beam.

If the ion beam 10, 10', 10" is scanned along the Z-direction (see the dotted and dashed lines in FIG. 1) within the active width of the MCP as illustrated, the total number of the actual MCP channels involved in the detection of the ion beam is significantly increased and therefore the detectable maximum local count rate and dynamic range is significantly improved while keeping the same detector 1D resolution along the X-direction. As the spot 12, 12', 12" illuminates different parts of the detector's front 112 at different times, the aggregated active width of the MCP in the Z-direction (vertical) involved in this detection process can be extended to more than 20 mm, resulting in at least an order of magnitude of improvement as compared to known detectors. This helps to improve the local count rate and dynamic range by more than an order of magnitude compared to the case according to which the ion beam is not scanned on the MCP assembly's front face 112. This scanning mechanism also helps to further reduce the probability for multiple ions hitting the same channel, and therefore to further improve the detection efficiency of the MCP detector assembly.

Figure 2:
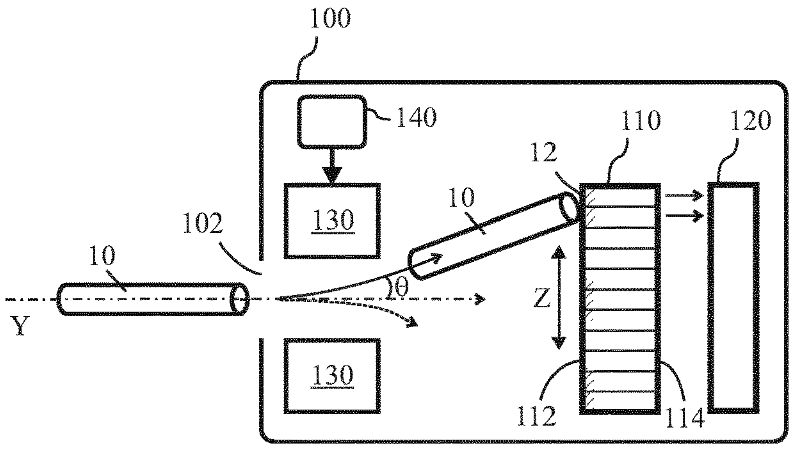
FIG. 2 is a schematic illustration of a lateral cut through a detection apparatus in accordance with a preferred embodiment of the invention.

FIG. 2 provides a schematic view of an apparatus 100 in accordance with a preferred embodiment of the invention. The detection apparatus 100 comprises an opening or inlet 102 through which a beam 10 carrying charged particles such as ions or cluster ions is able to enter the apparatus. It is appreciated that due to the lateral cut view, the inlet extends along the X direction as shown in FIG. 1, forming a slit. Multiple charged ion beams enter the apparatus 100, scattered along the X direction and propagating towards the deflection and detection means. In the example that is illustrated, by way of a non-limiting example, an incoming charged particle beam 10 travels along the direction Y towards the inlet. Beam deflection means 130 are arranged downstream of the inlet. The beam deflection means may comprise deflection plates, a device of the Bradbury-Nielsen Gate type, or other units known in the art for selectively acting on the direction of the charged particle beam's direction. Depending on the selected magnitude of deflection, which is controlled by a control unit 140, the charged particle beam 10 that traverses the deflection means is deflected by a corresponding deflection angle θ with respect to its initial propagation direction Y. The deflection angle is typically a function of the strength of the electric field in which the charged particle beam evolves while traversing the deflection means 130. Once the charged beam 10 exits the deflection means, it continues its deviated trajectory in a straight line, the entire apparatus being contained in a vacuum enclosure that is not illustrated. Further downstream of the deflection means 130, a microchannel plate, MCP, assembly 110 is arranged. The MCP assembly comprises a plurality of microchannels forming a detection front 112, for receiving the charged particle beam. Depending on the deflection angle θ, the spot generated by the beam on the detection front 112 illuminates a different set of channels 12 along the Z direction. For each charged particle entering a channel, a corresponding amplified electrical signal is generated on the exit face 114 of the detector. These detection signals are collected by at least one read-out anode 120, which is arranged at a distance to, and in parallel with the exit face 114 of the MCP assembly. The read-out anode 120 is operatively coupled to data processing means, which are not illustrated. The data processing means are configured for storing the detection counts provided by the read-out anode in a memory element and/or for further processing the recorded data.

Figure 3:
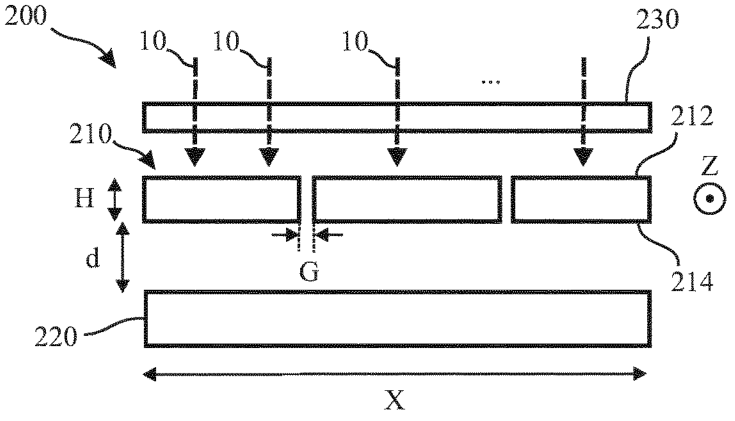
FIG. 3 is a schematic illustration of a top view of a detection apparatus in accordance with a preferred embodiment of the invention.

FIG. 3 shows a top view of a cut through a detection apparatus 200 in accordance with a preferred embodiment of the invention. For the sake of explaining the various concepts, the illustrated dimensions are not at scale and some distances have been exaggerated for easier appreciation of the figure. The apparatus comprises a front area that extends along a principal direction X, and along the perpendicular Z direction. The detection front 212 comprises the respective entry faces of a plurality of microchannel plate, MCP, assemblies 210 arranged side by side along the X direction. The front faces 212 of the MCP assemblies make up the front area and the same numerals will be used to designate both. An exception is given by the physical gaps or interstices G that separate the MCP assemblies. In the example shown, three MCP assemblies are used. Of course, other pluralities are possible without departing from the scope of the present invention. Depending on the available MCP sizes and on the desired total length in the X direction (e.g., from less than 1 cm to over 100 cm for a typical Mattauch-Herzog type mass spectrometer) of the detection front, an appropriate number of MCP assemblies is integrated into the device 200. In the example of FIG. 3, MCP assemblies extending over different lengths are arranged side by side. Each MCP assembly provides a differently sized entry face. The depth H of each MCP assembly 210 is preferably the same, so that the amplification characteristics are uniform along the length of the detector in the X direction. By way of a non-limiting example, the depth H is typically of about 0.5 to 1 mm for a single MCP assemblies, 1-2 mm for a Chevron type stacked MCP assembly, and 1.5-3 mm for a Z-stacked type MCP assembly. Ideally, the gaps G are of neglectable size, but they should in practice not be larger than 1 mm. Indeed, a charged particle (i.e. ions, electrons) impinging on the front face 212 can only be detected if it hits a front face 212 of one of the MCPs, the gaps G forming dead spots in the detection range. Preferably, the gaps between any two adjacent MCP assemblies are of uniform size. Each impinging charged particle generates a corresponding amplified signal at the exit face 214 of the MCP assembly whose entry face 212 it hit. The gap G extends to the respective exit faces of two adjacent MCP assemblies. In order to detect the amplified signals, at least one read-out anode 220 is arranged in parallel to the exit faces of the MCP assemblies 210, at a distance d (typically but not limited to 2-5 mm) therefrom. Irrespective of the use of a single MCP assembly, or of multiple MCP assemblies, the read-out anode(s) is/are operatively coupled to non-illustrated data processing means, which store the detection counts read by the anode (s), together with their position along the X axis and the Z-axis of the detector. The position of a detection event along the Z direction is dictated by the deflection that is inflicted on the charged particle beams 10 by the beam deflection means 230 arranged upstream from the MCP assemblies 210. Information describing the configuration of the detection apparatus at the time of recording, i.e. a deflection voltage, angle or a deflection distance on the MCP's entry face, is also stored together with the detection counts for each detection event. The values of these parameters are available at the non-illustrated control unit determining the deflection angle applied by the deflection means 230. By doing so, spectral data of the incoming charged particles, 10 is produced. The spectral data is preferably stored in a memory element for further processing thereof, or for displaying the same on a display device. The processing means may for example comprise a data processor having read/write access to a memory element. While the data processor may comprise specific circuitry designed for reading out the anode(s) 220, it may alternatively comprise a programmable processor, programmed to perform this task by an appropriate software code. All described components are held in place by a non-illustrated holder frame which may for example be a machined frame. Different types of anodes 220 may be considered for collecting the electrons leaving the MCP assemblies 210. The first type is a single anode, which is typically a single metal plate placed behind the MCP. This anode plate collects total number of electrons leaving the entire MCPs and therefore detects the total signal intensity hitting the MCPs (analog current or number of particles). The second type of anode is related to the position sensitive anode readouts, which can return both the position and the intensity of multiple events hitting the MCPs. Different types of position sensitive anode readout are currently used for the MCP-based detectors such as delay line, DL, anode, resistive anode, pixelated anode array, shaped anode array, etc. . . . .

If the detection front is composed of a plurality of MCP assemblies along the X axis, all MCP assemblies may preferably have substantially the same channel size and amplification gain characteristics. Further, all MCP assemblies may have the same width extending perpendicularly to said principal direction, i.e. along the Z axis. The apparatus further comprises non-illustrated biasing means configured for applying an electric potential difference between the respective entry and exit faces of each MCP assembly. The biasing means may for example comprise a source of electricity. In accordance with a preferred embodiment of the invention, the biasing means are configured for applying a positive or negative floating electric potential to the detector's front face, and for applying a common electric potential to the respective exit faces of all MCP assemblies.

Figure 4:
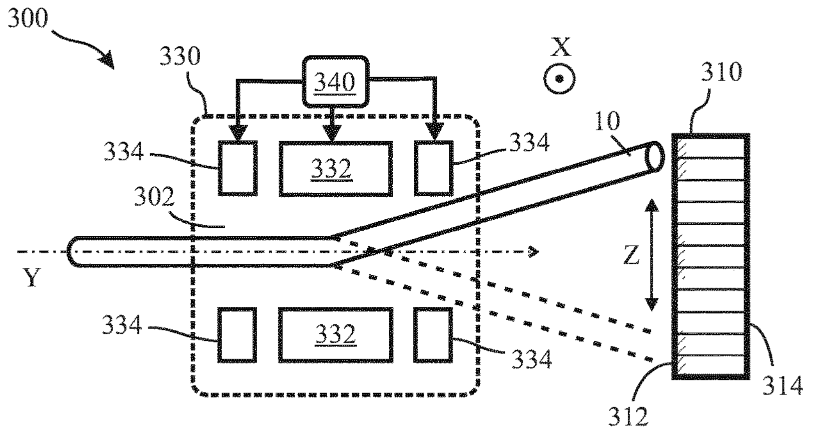
FIG. 4 is a schematic illustration of a lateral cut through a detection apparatus in accordance with a preferred embodiment of the invention.

In accordance with a preferred embodiment of the invention, the deflection means of the proposed detection apparatus are provided by a device comprising deflection plates, as illustrated in FIG. 4. FIG. 4 shows a lateral cut view through an apparatus 300 in accordance with an embodiment of the invention, comprising an inlet 302, MCP assemblies 310 as previously described having entry and exit faces 312, 314, and beam deflection means 330 comprising an ion beam deflector 332, 334, all extending in the X direction.

The two plates 332 in an ion beam deflector extend in parallel and define a passageway or gap for the charged particle beam 10 in between themselves. The deflector plates 332 are biased to opposite polarities to deflect the ion beams in a direction that is perpendicular to the plane in which the deflector plates extend. To this end, a source of electricity, voltage biasing unit or control unit 340 is used. The dimensions, relative arrangement and biasing electric potentials of the deflector 332, 334 are in practice optimised, for example through numerical simulation, to best match a given target application. By way of non-limiting example, the deflection plate width along the Y direction is preferably in the range from 2 mm to 8 mm. The distance between the plates 332 along the Z direction is preferably in the range from 3 mm to 5 mm. The gap between the plates 332 and the outer electrodes 334 (on both sides of the deflector to confine the fringe field regions to smaller distances) is in the range from 1 mm to 4 mm. Preferably, the distance between the plates is of about 4 mm, the gap between the plates and the outer electrodes is of about 2 mm, while the width of the plates along the Y direction is of about 6 mm. The distance between the outer electrodes, defining the inlet 302 of the apparatus, if preferably of about 6 mm. Preferably, the deflection plates 332 and outer electrodes 334 extend along the X axis, which is perpendicular to both Y and Z axes, by about 100 mm to 150 mm, and preferably by about 130 mm. Generally, the deflection length of the ion beams along the Z axis, i.e. the maximum span than can be scanned on the MCP assembly's entry face, increases with increasing deflection plate width. The mass resolution and transmission values decrease with increasing transmission plate width. The target of the deflection of 20 mm can be achievable for various combinations of the geometric and voltage values with the constraints of the mass resolution (at least up to half of the mass resolution observed at 0 V) and transmission (70%).

The working principle of the charged particle deflector 300 is as follows: the deflection distance along the Z axis, D, depends on the distance d between the deflection plates 332, their length L and the electrical potential difference ($\Delta V$) that is applied to the pair of plates ($\pm V$). When an ion enters with an energy of $eV_0$ into the electric field created between the two plates, ($E=-\Delta V/d$) it will be deflected with a deflection angle $\theta$.

Each MCP channel of an MCP assembly, whether of a single MCP, Chevron or Z-stack assembly, is characterized by recovery time, during which the channel cannot amplify a newly impinging charged particle. After a given response time, a saturated channel becomes once operational again. In accordance with a preferred embodiment, a control unit of the deflection means is therefore synchronized with the response time of the MCP assembly's micro-channels. The control unit effectively aims at steering the charged particle beam at all times, through deflection as previously described, to areas of the detection front that comprise operational MCP channels at the time of deflection. The speed of a continuously and linearly evolving scanning pattern is therefore preferably synchronized with the response time of the MCP channels, so that the charged particle beam illuminates the same channel only once it has completely recharged from the depletion caused by its previous illumination.

In an alternate embodiment, the control unit uses a sawtooth signal to scan multiple charged particle beams that are initially scattered along the X direction, periodically along the Z direction of the MCP assembly's detection front. A low-power high voltage operational amplifier scans the voltage of the ion deflection plates with a scan rate in the range from 1 Hz to 10 kHz. The scanning signal (sawtooth signal) consists of a combination of multiple scans of step voltages. The number of voltage steps depends on the size of the ion beams and the required deflection length of the ion beams in the vertical axis (Z) of the detector. A higher signal rate (>1 kHz) is desirable to achieve an enhanced signal count rate of the detector. The scanning rate is established in practice as a function of the recuperation time of a saturated channel of the MCP assembly When a measurement starts, the control unit sends a scanning signal to the high-voltage amplifier, and synchronously starts/triggers a Time-to-digital converter, TDC. Each time the step voltage changes, a pulse will pass to the TDC on a second line to increase an internal counter. During the acquisition, data is collected from the TDC. The raw data has acquired by the read-out anode and TDC has a format of {x position, y position, number of the voltage step, and iteration of the scan}. After multiple scans, there may be an integration time on each mass spectrum at different step voltages to combine all the mass spectra.

Figure 5:
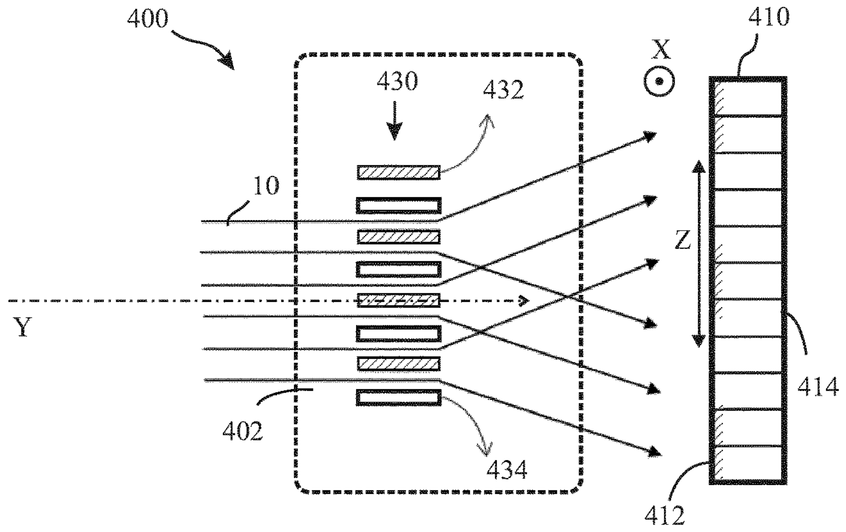
FIG. 5 is a schematic illustration of a charged particle deflection unit in accordance with a preferred embodiment of the invention.

FIG. 5 shows a lateral cut view through an apparatus 400 in accordance with an embodiment of the invention, comprising an inlet 402, MCP assemblies 410 as previously described having entry and exit faces 412, 414, and beam deflection means 430 comprising an ion beam deflector 432, 434.

The deflection means 430 of the proposed detection apparatus comprise a Bradbury-Nielsen Gate, BNG, device. A BNG device consists of two interleaved sets of wires or strips 433, 434 extending along the Y direction, which are equally spaced and are biased at opposite polarities so that the deflecting field region is limited to short distances, typically twice of the diameter of the wires or length of the strips. The strip width is for example in the range from 0 to 1.6 mm, each strip having a thickness of 50-100 μm. The distance between the strips is in the range from 0.4 mm to 1 mm. By way of example, for a charged particle beam comprising ions at 3 keV, the voltage on the strips may be ramped from 0V up to ±800 V by a corresponding non-illustrated control unit of the deflection means. The deflection length of the ion beams increases with increasing strip width. The transmission values decrease with increasing strip width. Depending on the applied voltages, the BNG scatters charged particle beams within an angle having a voltage-dependent opening along the Z direction.

In all presented embodiments, the detector device is able to be floated to a high voltage of up to 10 kV, while the floating potential may have either positive or negative polarity. The floating potential may preferably be applied to all components of the detection apparatus, including the beam deflection means.

Figure 6:
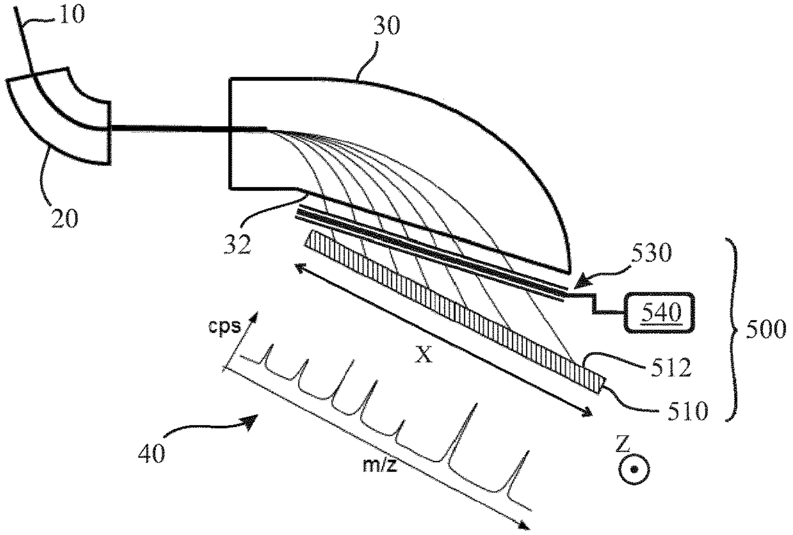
FIG. 6 is a schematic illustration of a mass spectrometer device in accordance with a preferred embodiment of the invention.

FIG. 6 illustrates components of a Mattauch-Herzog type spectrometer device in accordance with an aspect of the invention. Ions are generated by an ionization technique (not discussed here) and extracted from a sample under analysis. The ion beam 10 is then focused and analysed using different entities of the spectrometer. The functioning of such spectrometers, which use an electrostatic sector 20 followed by a magnetic sector 30 for filtering an incoming ion beam 10 is well understood in the art and will not be explained in further details in the context of this description. The magnetic sector 30 comprises an exit plane 32 through which the ions comprised in the initial beam exit, dispersed along a principal direction X in accordance with their respective mass-to-charge ratios. The spectrometer also comprises a detection apparatus in accordance with the present invention, as previously described. The detection apparatus 500 comprises beam deflection means 530, for example the previously described deflection plates, controlled by an operatively coupled control unit 540. The detection apparatus also comprises a detection area or front that features the entry face 512 of at least one MCP assembly 510. The detection front is arranged so as to be located on the focal plane of the spectrometer. It is appreciated in this example, that the entry face 512 of the MCP assembly 510 may extend at angle with respect to the deflection means 530. Also, the ion beams traverse the deflection means 430 at different angles along the X direction, resulting in traversing trajectories of different, but known lengths for each position along the X direction. For each out of N applied deflection voltages, i.e., for each deflection angle of all the filtered ion beams along the Z axis, perpendicular to X axis, a full mass spectrum 40 (i.e. a mass spectrum for all m/z ratios) of the sample is obtained by recording the correspondingly amplified detection signals on the non-illustrated read-out anode(s), as previously described. The data describing N corresponding partial mass spectra (i.e. partial counted detection events) may be combined into an aggregated mass spectrum of the sample (i.e., aggregated counted detection events for all m/z ratios) by a data processing unit having access to said memory element. The detection apparatus is high vacuum/ultra-high vacuum, HV/UHV, compatible and covers the full focal plane of the Mattauch-Herzog mass spectrometer, which is typically from several centimetres to several tens of centimetres. It provides one-dimensional (horizontal) spatial resolution of better than 100 μm, a local count rate of better than $10^6$ cps, a dynamic range better than $10^5$.

The N voltage/deflection steps are predetermined so that the correspondingly deflected spots generated by the deflected beam on the MCP entry faces span most of the entry face along the Z direction. Further, the response time of the MCP channels is taken into account: a given voltage step is applied during a time that corresponds at most to the time during which the MCP channels are capable of detection charged particles, until they saturate. Then the next voltage step is applied, wherein the difference between two steps is such that the deflected beam next illuminates a different set of micro-channels, which that are not in saturated mode. These measures maximize the availability of MCP channels for accurately counting detection events, thereby increasing the count rate of the apparatus. The corresponding calibration data depends on the type of MCP assembly that is used, on the dimensions of the apparatus, and on other factors. These data are provided on assembly of the apparatus and made available in a memory element to which the control unit 540 has read access.

At each of the N deflection steps, a corresponding detection signal is recorded using the read-out anode. Mass spectrum data for all m/z ratios is therefore recorded at each deflection step. The data corresponding to all steps is then combined, for example by adding up the successively read-out ion detection counts, to generate a full mass spectrum.

It should be understood that the detailed description of specific preferred embodiments is given by way of illustration only, since various changes and modifications within the scope of the invention will be apparent to the skilled person. The scope of protection is defined by the following set of claims.

The invention claimed is:

1. A detection apparatus for detecting charged particles, the detection apparatus comprising;

a charged particle beam inlet;

a detection front comprising an entry face of at least one microchannel plate (MCP) assembly, wherein the entry face extends along a first direction, wherein the MCP assembly is configured for receiving, along a second direction perpendicular to said first direction, a plurality of beams of charged particles that impinge on the entry face and for generating, for each impinging the beam of charged particles, a corresponding amplified detection signal on an opposite exit face;

at least one read-out anode for collecting said amplified detection signals, the anode being arranged at a distance to, and in parallel with the exit face of said at least one MCP assembly, a beam deflection means arranged downstream of said charged particle beam inlet at a distance from said entry face and configured for selectively deflecting incoming beams of the charged particles along said first direction, so that the corresponding the beams of charged particles selectively reach different portions of the entry face of the at least one MCP assembly along said first direction;

wherein the charged particle beam inlet, the beam deflection means, the detection front, and the at least one read-out anode extend along said second direction.

2. The apparatus according to claim 1, wherein said beam deflection means comprise a charged particle optics unit and a control unit, the control unit being configured to dynamically control a deflection angle to be applied to a propagation direction of the charged particle beam by the charged particle optics unit.

3. The apparatus according to claim 2, wherein said charged particle optics unit comprises a pair of deflection plates.

4. The apparatus according to claim 1, wherein said beam deflection means comprise a charged particle optics unit and a control unit, the control unit being configured to dynamically control an opening angle within which a propagation direction of the charged particle beam is deflected by the charged particle optics unit.

5. The apparatus according to claim 4, wherein said charged particle optics unit comprises a Bradbury Nielsen Grid.

6. The apparatus according to claim 1, wherein the entry face of said at least one MCP assembly extends over 2 to 3 cm along said first direction direction.

7. The apparatus according to claim 1, wherein the at least one MCP assembly includes a plurality of MCP assemblies that include a plurality of entry faces, wherein the entry faces of the plurality of MCP assemblies extend over an aggregated length of at least 15 cm in said second direction.

8. The apparatus according to claim 7, further comprising one dedicated read-out anode for each of the MCP assemblies, and wherein said read-out anode extends along the corresponding exit face of the MCP assembly.

9. The apparatus according to claim 1, wherein the at least one read-out anode includes at least one of a delay-line anode, a pixelated anode array, a resistive anode, a shaped anode, and a single anode.

10. The apparatus according to claim 1, further comprising biasing means configured for applying a positive or negative floating electric potential to components of the apparatus, including the beam deflection means.

11. The apparatus according to claim 1, wherein said charged particles comprise ions.

12. The apparatus according to claim 1, wherein said charged particles comprise electrons.

13. A mass spectrometer for dispersing ions along a focal plane in accordance with their mass/charge ratio, the spectrometer comprising the detection apparatus of claim 1, the detection front of the detection apparatus being arranged on said focal plane so that said dispersed ions impinge on the detection front, wherein said first direction is perpendicular to the plane in which the ions are dispersed.

14. The mass spectrometer in accordance with claim 13, wherein the deflection means of said detection apparatus are arranged so as to deflect all dispersed ions exiting a mass filtering unit of the mass spectrometer.

15. The mass spectrometer according to claim 14, wherein the mass spectrometer is a Mattauch-Herzog type device.

16. The mass spectrometer in accordance with claim 13, wherein the detection front of said detection apparatus spans said focal plane so that any ions dispersed by a mass filtering unit of the mass spectrometer impinge there upon.

17. A method of using the mass spectrometer in accordance with claim 13, the method comprising the following steps:

a) dispersing ion species comprised in a secondary ion beam using a mass filtering unit of said mass spectrometer, thereby generating a plurality of ion beams;

b) using the beam deflection means of the spectrometer, deflecting said plurality of ion beams in accordance with a predetermined deflection angle along said first direction in which the at least one MCP assembly extends;

c) using the at least one read-out anode of the spectrometer, reading out the amplified detection signal, as provided by said at least one MCP assembly; and d) repeating steps b) and c) at least once using a different predetermined deflection angle.

18. The method according to claim 17, wherein steps b) and c) are repeated so as to scan the charged particle beam over the extent of the entry face of said at least one MCP assembly along said first direction.

19. The method according to claim 17, wherein the beam deflection means comprise a charged particle optics unit and a control unit, the control unit being configured to dynamically control a deflection angle to be applied to a propagation direction of the charged particle beam by the charged particle optics unit, and wherein between two successive iterations of step b), the deflection angle is altered so that the spot generated during a first iteration by a deflected beam on the entry face of said at least one MCP assembly does not overlap with the spot generated during a second iteration by the same deflected beam.

20. A method for detecting charged particles, using the apparatus of claim 1, the method comprising the following steps:

i) providing the plurality of charged particle beams;

ii) using the beam deflection means of the detection apparatus, deflecting said charged particle beams in accordance with a predetermined deflection angle along said first direction in which the at least one MCP assembly extends;

iii) using the at least one read-out anode of the detection apparatus, reading out the amplified detection signals, as provided by said at least one MCP assembly; and iv) repeating steps ii) and iii) at least once using a different predetermined deflection angle.

* * * * *